US011163750B2

(12) United States Patent
Bhagwat et al.

(10) Patent No.: US 11,163,750 B2
(45) Date of Patent: Nov. 2, 2021

(54) DYNAMIC, TRANSPARENT MANIPULATION OF CONTENT AND/OR NAMESPACES WITHIN DATA STORAGE SYSTEMS

(71) Applicant: International Business Machines Corporation, Armonk, NY (US)

(72) Inventors: Deepavali M. Bhagwat, Cupertino, CA (US); Wayne A. Sawdon, San Jose, CA (US); Constantine Arnold, San Jose, CA (US); Dimitrios Skourtis, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 16/144,951

(22) Filed: Sep. 27, 2018

(65) Prior Publication Data
US 2020/0104390 A1 Apr. 2, 2020

(51) Int. Cl.
*G06F 16/00* (2019.01)
*G06F 16/23* (2019.01)
(Continued)

(52) U.S. Cl.
CPC .......... *G06F 16/2365* (2019.01); *G06F 3/067* (2013.01); *G06F 3/0622* (2013.01);
(Continued)

(58) Field of Classification Search
CPC .... G06F 16/258; G06F 16/86; G06F 16/2365; G06F 16/2291; G06F 2212/7201;
(Continued)

(56) References Cited

U.S. PATENT DOCUMENTS 5,717,788 A * 2/1998 Barnsley ................. G06T 9/001
382/249
7,117,228 B2 10/2006 Tomita et al.
(Continued)

FOREIGN PATENT DOCUMENTS

EP 2302533 A1 3/2011

OTHER PUBLICATIONS

Mariappan et al., "Processing and Performance of Text File Format on Different Data Storage Systems," International Journal of Power Control Signal and Computation (IJPCSC), vol. 2, No. 1, 2011, pp. 34-37.
(Continued)

*Primary Examiner* — Augustine K. Obisesan
(74) *Attorney, Agent, or Firm* — Zilka-Kotab, P.C.

(57) ABSTRACT

In one embodiment, a computer-implemented method for namespace and content manipulation within a storage system includes: defining policy rule(s), each policy rule dictating: how namespaces within the storage system may be transformed; and/or how content stored within the storage system may be transformed; receiving a request for access to a particular data set stored within the storage system; parsing the request to determine one or more transformations requested therein and/or required thereby; determining whether the particular data set is compliant with the one or more transformations; in response to determining the particular data set is compliant with the one or more transformations, providing access to the particular data set; and in response to determining the particular data set is not compliant with the one or more transformations, performing the one or more transformations to generate a transformed data set, and providing access to the transformed data set.

20 Claims, 4 Drawing Sheets (51) Int. Cl.
*G06F 3/06* (2006.01)
*G06F 16/25* (2019.01)
*G06F 16/22* (2019.01)

(52) U.S. Cl.
CPC ........ *G06F 3/0637* (2013.01); *G06F 16/2291* (2019.01); *G06F 16/258* (2019.01)

(58) Field of Classification Search
CPC ............. G06F 2212/657; G06F 3/0661; G06F 3/0622; G06F 3/0637; G06F 3/067; G06F 9/44536
See application file for complete search history.

(56) References Cited

U.S. PATENT DOCUMENTS

| | | | |
|---|---|---|---|
| 8,239,386 B2 | 8/2012 | Bahlmann et al. | |
| 8,259,741 B2 | 9/2012 | Sandstrom | |
| 8,510,464 B2 | 8/2013 | Dharmistan | |
| 8,554,871 B2 | 10/2013 | Samsalovic | |
| 9,031,895 B2 | 5/2015 | Schon | |
| 9,146,119 B2 | 9/2015 | Chen et al. | |
| 9,307,281 B2 | 4/2016 | Bryant et al. | |
| 9,355,416 B2 | 5/2016 | Graziano | |
| 9,423,964 B1 | 8/2016 | Randall et al. | |
| 9,484,006 B2 | 11/2016 | Konnola et al. | |
| 2004/0230792 A1* | 11/2004 | McCarty | G06F 21/10 713/153 |
| 2007/0050364 A1* | 3/2007 | Cummins | G06F 16/24564 |
| 2007/0061522 A1 | 3/2007 | Vink | |
| 2007/0294661 A1* | 12/2007 | Devarakonda | G06F 9/44505 717/104 |
| 2008/0163056 A1 | 7/2008 | Lamadon | |
| 2008/0177793 A1 | 7/2008 | Epstein et al. | |
| 2010/0325219 A1* | 12/2010 | Vasters | G06F 11/1425 709/206 |
| 2011/0145593 A1* | 6/2011 | Auradkar | H04L 9/006 713/189 |
| 2012/0079175 A1* | 3/2012 | Flynn | G11C 7/1012 711/103 |
| 2014/0359070 A1 | 12/2014 | Sundaram et al. | |
| 2015/0161655 A1 | 6/2015 | Bidyuk et al. | |
| 2015/0324381 A1 | 11/2015 | Brand | |
| 2016/0154866 A1 | 6/2016 | Teletia | |
| 2016/0239191 A1 | 8/2016 | Krishnasamy | |
| 2016/0267103 A1 | 9/2016 | Slik et al. | |
| 2016/0378817 A1* | 12/2016 | Fuller | G06F 3/0481 707/690 |
| 2017/0097952 A1 | 4/2017 | Chen | |
| 2017/0177452 A1 | 6/2017 | Parab et al. | |
| 2018/0075042 A1* | 3/2018 | Cruz | G06F 16/84 |
| 2018/0232426 A1* | 8/2018 | Gomez | G06F 16/258 |
| 2018/0357255 A1* | 12/2018 | Arasan | G06F 16/164 |
| 2019/0004737 A1* | 1/2019 | Khan | G06F 13/38 |

OTHER PUBLICATIONS

Gencay et al., "SANchk: SQL-Based SAN Configuration Checking," IEEE Transactions on Network and Service Management, 2008, pp. 1-9.
Misedakis et al., "Web Page Fragmentation and Content Manipulation for Constructing Personalized Portals," APWeb 2004, LNCS 3007, 2004, pp. 744-754.
Chai et al., "Final Specification of Mechanisms, Protocols and Algorithms for the Content Mediation System," The Comet Consortium, 2012, 100 pages.
Hicks et al., "User-specified Adaptive Scheduling in a Streaming Media Network," 2003, 29 pages, retrieved from http://www.cs.umd.edu/~mwh/papers/medianet-extended.pdf.
Github, "libfuse," GitHub, 2018, 3 pages, retrieved from https://github.com/libfuse/libfuses.
Wikipedia, "Filesystem in Userspace," Wikipedia, 2018, 3 pages, retrieved from https://en.wikipedia.org/wiki/Filesystem_in_Userspace.
Fekry, A., "Big Data gets bigger: what about data cleaning as a storage service?" HotStorage '17 2017, 2 pages, retrieved from https://www.usenix.org/conference/hotstorage17/program/presentation/fekry.
Yan et al., "Customizing Progressive JPEG for Efficient Image Storage," HotStorage '17, 2017, 6 pages, retrieved from https://www.usenix.org/conference/hotstorage17/program/presentation/yan.
Gupta-Cledat et al., "Addressing the Dark Side of Vision Research: Storage," HotStorage '17, 2017, 6 pages, retrieved from https://www.usenix.org/conference/hotstorage17/program/presentation/gupta-cledat.
Zhang et al., "The Composite-file File System: Decoupling the One-to-one Mapping of Files and Metadata for Better Performance," 14th USENIX Conference on File and Storage Technologies (FAST '16), Feb. 2016, pp. 15-22.
Robinson et al., "The Common Gateway Interface (CGI) Version 1.1," The Internet Society, Oct. 2004, 37 pages, retrieved from https://tools.ietf.org/html/rfc3875.
Wikipedia, "Common Gateway Interface," Wikipedia, 2018, pp. 1-7, retrieved from https://en.wikipedia.org/wiki/Common_Gateway_Interface.
Github, "The OpenAPI Specification," GitHub, 2018, 3 pages, retrieved from https://github.com/OAI/OpenAPI-Specification.
Wikipedia, "Representational state transfer," Wikipedia, 7 pages, retrieved from https://en.wikipedia.org/wiki/Representational_state_transfer.

* cited by examiner

DYNAMIC, TRANSPARENT MANIPULATION OF CONTENT AND/OR NAMESPACES WITHIN DATA STORAGE SYSTEMS

BACKGROUND

The present invention relates to data storage, access, and manipulation within a data storage system. More specifically, this invention relates to providing dynamic access to data records via dynamic namespace manipulation using policy rules; user-specified data path overloading; and/or transparent content manipulation using policy rules.

Digital data is indexed on a storage system using paths. A path serves as a token of receipt of an agreement between a storage system and the owner/user of content to be stored on the storage system. The path for a file is explicitly specified by the owner at creation time. The path for an object system may be generated by the storage system and returned to the owner. In either case, when the path is presented to the storage system the expectation is for the storage system to return the stored content (assuming the requesting entity has the proper privileges to access the content) with fidelity.

Data paths for files and objects are typically stored in namespaces. Each component of the path is stored as an entry in the namespace. The entry may point to a target data file/object or to another directory/bucket containing the next component of the path. Path lookups and path listing read the contents of each directory/bucket to verify that the path is valid and determine the appropriate data content to return to the user.

In general, data paths are static entities which only change as the result of explicit user requests to change them. Barring an external change, if a user sees ten files in a directory today, the user will see the same ten files tomorrow and continue to see the same ten files until there is an explicit request to rename, move, create, delete, link, etc. one or more of the files in the directory, or the directory itself. Furthermore, and again barring some explicit request causing a change in the directory or file content, all users with appropriate permissions will see the same files every time they list the directory.

Data access is generally granted on an all-or-none basis, as long as the path/URL is correctly specified and the client has appropriate access privileges. This access, however, is either granted or not; as in, "all or nothing". When access is granted, content is available in fidelity. If access is not granted, no content is available. Lookups of pathnames (say in directories or container lists) always present an "all or nothing" interface. All users with permissions see all of the stored pathnames, whereas users lacking permission see none.

In all, conventional storage solutions lack the ability to dynamically manipulate namespaces and/or content in a manner that is transparent to applications relying on data stored/managed by the storage solution. It would be advantageous to provide systems and techniques for dynamic manipulation of namespaces and/or content to provide greater flexibility regarding how data are viewed and accessed within a storage system.

SUMMARY

According to one embodiment, a computer-implemented method for namespace and content manipulation within a storage system includes: defining one or more policy rules, each policy rule dictating: how namespaces within the storage system may be transformed; and/or how content stored within the storage system may be transformed; receiving a request for access to a particular data set stored within the storage system; parsing the request to determine one or more transformations requested therein and/or required thereby; determining whether the particular data set is compliant with the one or more transformations; in response to determining the particular data set is compliant with the one or more transformations, providing access to the particular data set; and in response to determining the particular data set is not compliant with the one or more transformations, performing the one or more transformations to generate a transformed data set, and providing access to the transformed data set.

According to another embodiment, a computer program product for namespace and content manipulation within a storage system includes a computer readable storage medium having program instructions embodied therewith, where the computer readable storage medium is not a transitory signal per se. The program instructions are executable by a storage system to cause the storage system to perform a method, comprising: defining, using a processor of the storage system, one or more policy rules, each policy rule dictating: how namespaces within the storage system may be transformed; and/or how content stored within the storage system may be transformed; receiving, at the storage system, a request for access to a particular data set stored within the storage system; parsing, using the processor, the request to determine one or more transformations requested therein or required thereby; determining, using the processor, whether the particular data set is compliant with the one or more transformations; in response to determining the particular data set is compliant with the one or more transformations, providing access to the particular data set; and in response to determining the particular data set is not compliant with the one or more transformations, performing the one or more transformations to generate a transformed data set, and providing access to the transformed data set.

According to yet another embodiment, a storage system for namespace and content manipulation includes: a processor; and logic integrated with the processor, executable by the processor, or integrated with and executable by the processor. The logic is configured to: define one or more policy rules, each policy rule dictating: how namespaces within the storage system may be transformed; and/or how content stored within the storage system may be transformed; receive a request for access to a particular data set stored within the storage system; parse the request to determine one or more transformations requested therein and/or required thereby; determine whether the particular data set is compliant with the one or more transformations; in response to determining the particular data set is compliant with the one or more transformations, provide access to the particular data set; and in response to determining the particular data set is not compliant with the one or more transformations, perform the one or more transformations to generate a transformed data set, and provide access to the transformed data set.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamic, transparent namespace and content manipulation in storage systems, as well as user-specified data path overloading for dynamic path and content manipulation. While the following description is provided generally with reference to a file system as an exemplary implementation, those having ordinary skill in the art will appreciate, upon reading the present disclosure in full, that the inventive concepts presented herein are equally applicable to object stores, without limitation and without departing from the scope of the invention.

According to one general embodiment, a computer-implemented method for namespace and content manipulation within a storage system includes: defining one or more policy rules, each policy rule dictating: how namespaces within the storage system may be transformed; and/or how content stored within the storage system may be transformed; receiving a request for access to a particular data set stored within the storage system; parsing the request to determine one or more transformations requested therein and/or required thereby; determining whether the particular data set is compliant with the one or more transformations; in response to determining the particular data set is compliant with the one or more transformations, providing access to the particular data set; and in response to determining the particular data set is not compliant with the one or more transformations, performing the one or more transformations to generate a transformed data set, and providing access to the transformed data set.

According to another general embodiment, a computer program product for namespace and content manipulation within a storage system includes a computer readable storage medium having program instructions embodied therewith, where the computer readable storage medium is not a transitory signal per se. The program instructions are executable by a storage system to cause the storage system to perform a method, comprising: defining, using a processor of the storage system, one or more policy rules, each policy rule dictating: how namespaces within the storage system may be transformed; and/or how content stored within the storage system may be transformed; receiving, at the storage system, a request for access to a particular data set stored within the storage system; parsing, using the processor, the request to determine one or more transformations requested therein and/or required thereby; determining, using the processor, whether the particular data set is compliant with the one or more transformations; in response to determining the particular data set is compliant with the one or more transformations, providing access to the particular data set; and in response to determining the particular data set is not compliant with the one or more transformations, performing the one or more transformations to generate a transformed data set, and providing access to the transformed data set.

According to yet another general embodiment, a storage system for namespace and content manipulation includes: a processor; and logic integrated with the processor, executable by the processor, or integrated with and executable by the processor. The logic is configured to: define one or more policy rules, each policy rule dictating: how namespaces within the storage system may be transformed; and/or how content stored within the storage system may be transformed; receive a request for access to a particular data set stored within the storage system; parse the request to determine one or more transformations requested therein and/or required thereby; determine whether the particular data set is compliant with the one or more transformations; in response to determining the particular data set is compliant with the one or more transformations, provide access to the particular data set; and in response to determining the particular data set is not compliant with the one or more transformations, perform the one or more transformations to generate a transformed data set, and provide access to the transformed data set.

Figure 1:
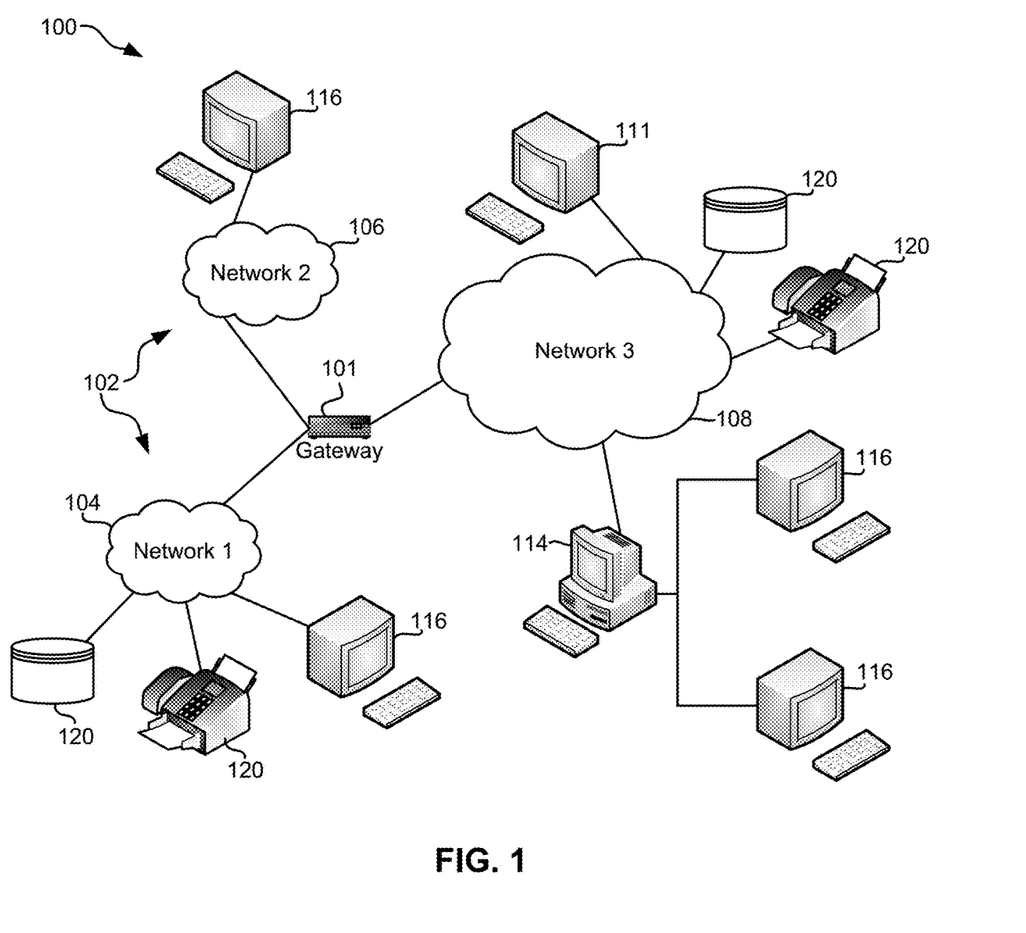
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
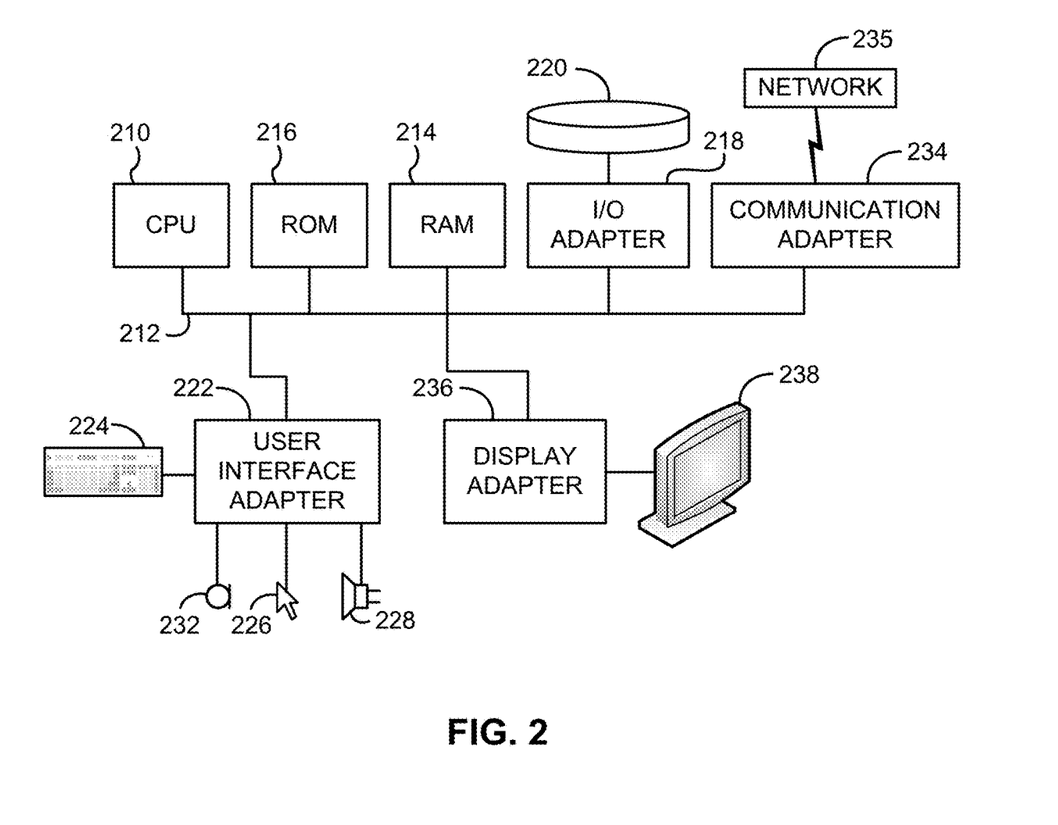
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Returning now to the specific notion of transparent, dynamic namespace and content manipulation within a storage system, it should be understood that "dynamic" manipulation refers to non-conventional techniques and mechanisms for manipulating content and/or namespaces within a data storage system. For example, dynamic manipulation does not include or refer to simple calling of a path and listing of files within the corresponding storage location/directory. Nor does dynamic manipulation include conventional storage system commands such as "move," "delete" etc. that are issued/performed/executed in a static manner on files or namespaces upon call thereof using conventional techniques.

Instead, dynamic manipulation (as will be described in various embodiments and further detail below) of content and/or namespaces occurs via implementing policy rules at specified junctions within the storage system data and control path, where the policy rules allow/facilitate evaluation of stated conditions regarding a namespace or content of interest, and further allow/facilitate performing certain transformations or operations on the namespace/content based on the result of evaluating the stated conditions.

According to preferred approaches, policy rules effectively comprise one or more conditions to be evaluated, and corresponding operations to perform depending on the result of the evaluation. For instance, if a given status of a data record, evaluated against a condition specifying data are in a specific format (e.g. image data in the form of thumbnails), returns true, then the data residing on the storage system may be provided to the client in that specific format. Otherwise, in response to determining the data are not in the specified format (condition evaluates to false), a virtual view may be created to display the requested data in the requested format. Of course, it should be understood that in various embodiments policy rules may state any relevant condition and associated operations relevant to namespace manipulation, content manipulation, or both.

In practice, the policy rules and corresponding functions are preferably provided in compiled form, and encoded into data structures (such as decision trees, in preferred embodiments) which are available at the specified junctions throughout the storage system data and control path. Specified junctions may include various constructs in the internal metadata, within the namespace, and/or within a functional stack (e.g. a software stack of operations to be performed on data).

For instance, in one embodiment upon evaluating a path and confirming the validity thereof, disk access may be executed to access corresponding records, and the decision to perform a disk access may be a junction where/at which time policy rules are evaluated. Additional exemplary junctions may include loading read data into a buffer for delivery to a user, upon loading of data into an application requesting the data, etc. As will be appreciated by those having ordinary skill in the art upon reading the present descriptions, junctions, generally speaking, are hooks that may be inserted into the data path and/or control path instructing the storage system to perform certain functions on namespaces and/or stored content, in response to a specified outcome of evaluating one or more policy rules associated with said functions.

"Transparent" manipulation of content, as utilized herein, refers to transparency from the point of view of an application or applications using or otherwise relying on data. Accordingly, transparent content manipulation includes any form of manipulating content that is performed in a manner that does not interrupt, influence, or otherwise affect the operation of an application utilizing stored data at the time of performing the transparent content manipulation.

For example, in one embodiment transparent content manipulation includes downsampling image data and presenting the downsampled image data in response to a request for a downsampled version of the image data as-stored on the storage system. The stored data file, which is being accessed by another application for some other purpose, may be read from storage, and in a manner transparent to the application, e.g. by writing a copy of the data to a cache or buffer, or by providing the as-stored data to a downsampling function and writing the output to a separate location (e.g. the buffer, cache, or some other storage location), a downsampled version of the image may be created and provided to the requesting entity. Other examples of transparent content manipulation will be explored in greater detail and variety below.

Now referring to FIG. 3A, a conventional scheme for accessing and/or manipulating data within a storage system is shown, for purposes of comparison to the inventive scheme shown in FIG. 3B and discussed in greater detail below. Generally, a user submits a request for access to a location within data storage 120 by specifying a path to a filesystem 302 or object storage API 302 (depending on the nature and organization of the storage system). In response to receiving the request, a component of the filesystem/object storage API 302 such as a storage system manager evaluates the validity of the path, and if valid returns the content stored in the corresponding location. Depending on the nature of the request, the returned result may include simply a listing of content stored in a directory specified by the path/URL, and/or a particular file/object, e.g. by reading the file/object and storing to memory, in a cache, buffer, etc. as would be understood by a person having ordinary skill in the art upon reading the present descriptions.

Figure 3A:
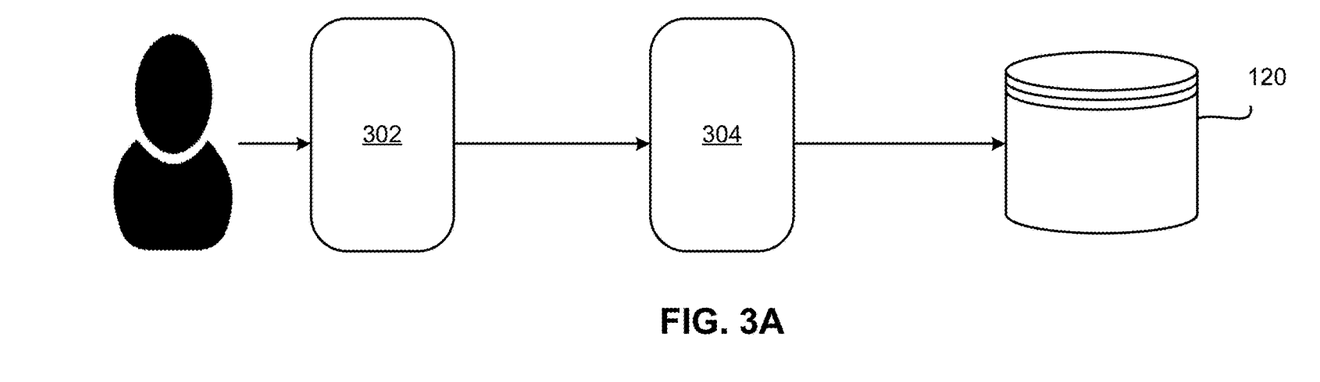
FIG. 3A illustrates simplified schematic of a conventional data storage system and pathname-based access to content stored in the data storage system.

Importantly, in accordance with conventional storage systems and access techniques such as represented by FIG. 3A, the user is not provided any mechanism to transparently and/or dynamically manipulate content or namespaces of the storage system. The user may only call certain paths within the storage system, and subsequently accomplish manipulation via separately submitted commands (e.g. move, delete, link, rename, etc.).

Figure 3B:
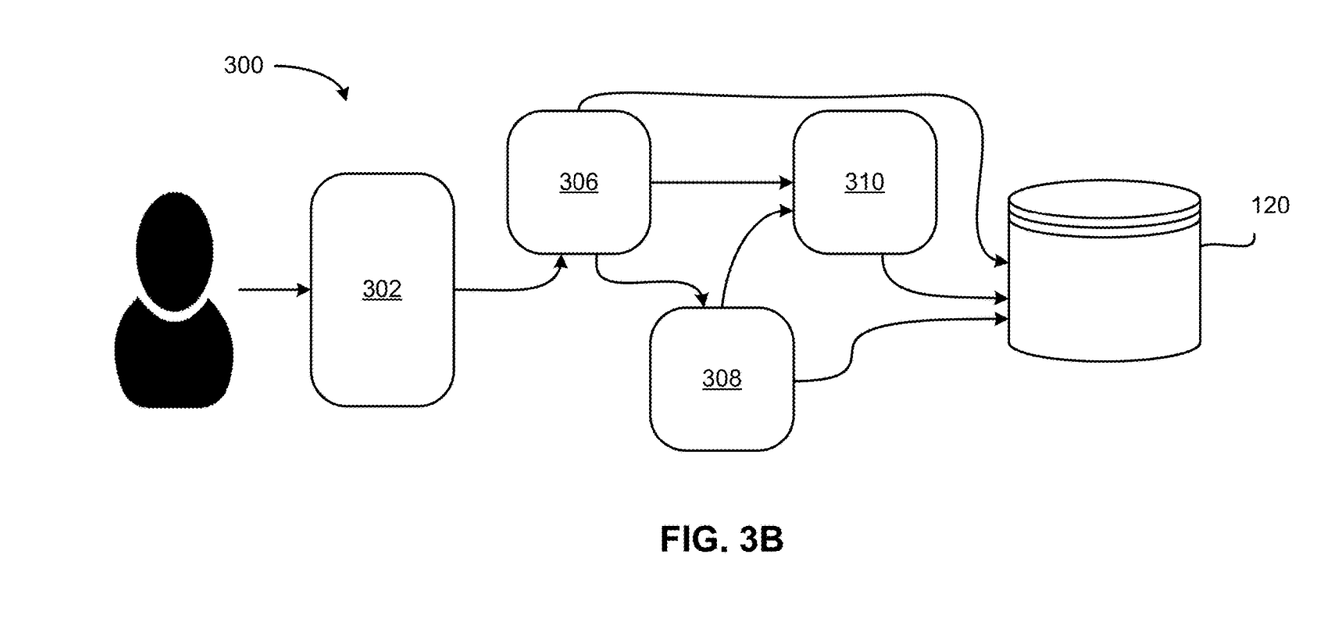
FIG. 3B is a simplified schematic of an inventive data storage system providing dynamic namespace and/or content manipulation, as well as user-mediated overloading of data paths, according to one embodiment.

Turning now to FIG. 3B, and in accordance with one embodiment of the inventive concepts presented herein, an illustrative schematic of a storage system 300 configured for dynamic, transparent manipulation of content and/or namespaces, as well as overloading user-specified data paths for such dynamic path and content manipulation, is shown. The storage system 300 may include additional and/or alternative features, components, functions, etc. beyond those shown in FIG. 3B, including but not limited to those shown and discussed herein with respect to FIGS. 1-2 and 4, in various approaches.

The inventive system and corresponding techniques represented by FIG. 3B and corresponding descriptions provided herein is characterized by including a rule engine and application programming interface (API) that facilitate a user: (1) specifying constraints/conditions (e.g. using "WHERE" clauses in logical statements to evaluate particular conditions which may trigger performance of corresponding operations); (2) specifying actions (e.g. using "DO" clauses or the like) to perform in response to particular constraints/conditions being satisfied (or not satisfied); and (3) specifying filters applicable to the constraints and/or actions (e.g. using "SELECT" clauses). Of course, it will be understood that other logical constructs, (e.g. "FOR", "IF", "THEN", "WHILE", "RUN," "OPEN," "PRINT," etc., without limitation) may be employed without departing from the scope of the presently described inventive concepts. In general, and according to preferred approaches, the rule engine and API preferably include a structured query language (SQL)-type language construct which serves as the basis for issuing various commands via the system.

Additionally, inventive storage systems as described herein preferably include native support for basic manipulations of data and/or namespaces in order to facilitate the presently described functionalities. For instance, basic manipulations should be understood as including, but not being limited to, controlling file and/or object visibility (which may occur at any level or based on any criterion or set of criteria of a namespace, content, and/or requesting entity, such as restricting access to content/namespaces based on user identity, restricting access to certain portions of content/namespaces, etc. where here "access" refers to read and write access); choosing content and/or metadata extractors and/or manipulators to invoke for certain file types/namespaces; auditing/annotating files and/or objects; and coalescing, expanding, or constructing file/object hierarchies, in various embodiments.

As will be appreciated by skilled artisans upon reading the present disclosure, the inventive concepts described herein also include appropriate instrumentation and integration of the aforementioned rule engine, API, and native support functionalities directly into the storage/filesystem code.

With continuing reference to FIG. 3B, the inventive storage system 300 includes at least three novel features/capabilities not capable of being performed in a conventional storage system such as shown in FIG. 3A.

In no particular order, these features/capabilities include, but are not limited to, a virtual path module 306, an overload module 308, and a data manipulation module 310. Any given request for data access, and/or internal operation of the storage system 300, may leverage functionality of any combination of modules 306-310 without departing from the scope of the present disclosure. For instance, and as indicated by the various arrows in FIG. 3B, a request may be received from a user at or via a filesystem/object API 302, but instead of displaying an actual path view 304 as in the conventional case shown in FIG. 3A, the user is optionally provided one or more virtual views generated by virtual path module 306. Virtual views may be provided in response to evaluating the user's request and/or storage location corresponding thereto against a plurality of policy rules.

Generally speaking, although again without limitation, virtual path module 306 employs dynamic namespace manipulation based on policy rules to provide users access to data and/or storage locations which may not physically exist on the storage system 300, but which logically do exist within the storage system 300.

For example, storage system 300 may include an image file stored at given location therein. The image file physically resides on the storage system 300, e.g. within a location of data storage device 120. However, only the native version of the image file physically resides on the storage system 300. A user may wish to view only thumbnails of image data stored on storage system 300, and may submit a request for access to image data, the request including a dynamic namespace manipulation instructing the storage system to return only thumbnail versions of image data stored within the storage system 300 or certain locations thereof. For instance, assuming the storage system is a block storage system implementing a filesystem structure, a user may submit a request "/fs/thumbnail/" to instruct the storage system 300 to return a thumbnail version of image files stored on the filesystem, even though no such thumbnails physically exist or reside on the storage system 300.

As another example, a user may wish to view files within the storage system according to some temporal restriction, such as viewing all files created/modified within the past day, week, month, etc. The user may submit a request "/fs/this_week/" which returns all files manipulated within the past week.

In various embodiments, virtual path module 306 is configured to provide a variety of different virtual namespaces, which may be based on rules, security policies, user-defined cognitive solutions, etc.

For instance, rule-based views may include views generated contingent upon the user, the location, the time, the type of process to be applied to data, attributes of the process and/or data, etc. as would be understood by a person having ordinary skill in the art upon reading the present disclosure.

Security-based views may include views configured to hide sensitive files or objects, disable access to certain files or objects (based on security rules), etc. in various embodiments. Security-based views may additionally or alternatively include or create decoy files or objects, e.g. to mitigate or prevent malware from accessing/manipulating sensitive information stored on the storage system.

User-specified and/or cognitive solution views may be created based on customized criteria specified by a user, e.g. within a request for access to data, within a policy rule, or some combination thereof, in various embodiments. In more approaches, artificial intelligence may be used to generate views, as another example of namespace manipulation and possible functionality of virtual path module 306.

Paths (namespaces) may also be manipulated upon read and write, e.g. to create shadow files, keep per-file audits, defeat crawlers, ransomware, intrusion, etc. and/or provide a virtualized namespace. Further still, content may be directly manipulated via the namespace. For example, a data record such as a spreadsheet may be read in a manner that performs/includes making changes to one or more values of the spreadsheet, e.g. to reformat values into a desired form.

Accordingly, via implementing virtual path module 306, path lookup and path listings need not simply return the stored directory entries, but preferably should also be able to manipulate the entries in a variety of manners. These manipulations may be controlled via a policy language as described herein. In general, manipulations may involve adding entries, removing entries and modifying existing entries.

These manipulations can be used to expose more information about a file. For example an entry for a file named "XYZ" may include additional entries to indicate the file is currently in use/locked by other users, such as "XYZ.locked_by_user1". This serves to warn the user that updates to the file may be lost and overwritten by user1.

The manipulations, in some embodiments, can remove entries, based on the user, the time of day, the load on the system, etc. These restrictions may provide privacy, by hiding entries or it may help to control costs, by restricting user actions while the system is heavily loaded. It could also eliminate entries for owners that opt out of specific queries.

Moreover, the manipulations can be used to obfuscate entries, in more embodiments. For example, obfuscation may be accomplished by replacing patient information with generic information for "patient123". Thus namespace manipulation is capable of removing all personal identifiable information (PII) or sensitive information from the entries displayed in a virtual view, in preferred approaches.

Accordingly, virtual path module 306 provides important added functionality to a storage system and facilitates protecting sensitive data, while also providing increased flexibility regarding how, in what form, and/or to whom data are released for access.

Referring again to FIG. 3B, a second function provided via the inventive concepts presented herein employs overload module 308 to overload user-specified data paths for dynamic path and content manipulation. The overload module 308 essentially provides additional information that directs a storage system how to manipulate data, preferably based on a user's specified data, data path, etc.

Additional or alternative overload functions capable of being performed by overload module 308 include, but are not limited to, formatting requests, subset requests, and/or content processing requests.

In one exemplary embodiment, formatting requests specified by a user may include requests to return a bitmap (.bmp) version of an image stored in some other format on the storage system, e.g. stored as a JPEG (.jpeg or .jpg) file. In more approaches, formatting requests may include a request to format a plot of time series in a particular manner, e.g. as a JSON or XML formatted file.

In a similar vein, subset requests may include user-specified instructions to manipulate or display only a portion of a file, such as to resize a file, display a subset by location or feature, e.g. display a top left section of an image, or a section corresponding to a particular organ from a full-body scan source image, etc. as would be understood by persons having ordinary skill in the art upon reading the present disclosure.

Further still, and with continuing reference to overload module 308, content processing requests may include requests to summarize data, such as by providing a summary of particular columns in a tabular data structure, statistical summaries of a dataset, etc. in various embodiments and as would be appreciated by skilled artisans upon a complete review of the descriptions provided herein.

The foregoing user-requested/specified data path manipulations, in preferred approaches, may be performed based on commands specified by the user in the request for access to the data or a corresponding namespace. For instance, a resizing request for an image "body.jpg" stored on a storage system at a location "/fs/mri/" may include a desired resolution of the resized image and the desired resolution may be specified directly in the path, e.g. "/fs/mri/body.jpg.200×80" in accordance with preferred embodiments. Similarly, format operations may specify the preferred format, and content processing operations may specify the particular subset of data and/or statistical analyses to be performed thereon, in still more preferred embodiments.

With continuing reference to FIG. 3B, data manipulation module 310 is configured for manipulation of data content via policy rules, e.g. using locally-available functions and/or using an API. Locally-available functions may be provided as a set of predetermined capabilities/operations for manipulating data, while embodiments employing an API may receive new/custom-defined functions to execute on data records, e.g. as may be defined by a system administrator to manage the storage system and/or a user to access data records in a particular form or modify data records in a particular manner.

In various embodiments, data manipulation module 310 may be configured to perform any combination of the following exemplary functions, without limitation.

In one approach, data manipulation module 310 is configured to perform transparent data manipulation. For example, transparent data manipulation may include operations wherein content is transformed to a more space efficient format, e.g. by converting an image bitmap to jpeg or other compressed format. In another exemplary approach, transparent data manipulation involves transforming content to a default standard format, e.g. converting a proprietary time series to a JavaScript object notation (JSON) format, eXtensive Markup Language (XML) format, etc. as would be appreciated by a person having ordinary skill in the art upon reading the present disclosure. Preferably, the manipulations are transparent to application(s) that may be accessing the corresponding data record(s)/set(s) at the time of transforming the data.

In more embodiments, data manipulation module 310 may be configured to perform transcoding operations, such as transforming stored content from one format to another, such as performing speech-to-text, text-to-speech, or other similar transformations. Transcoding operations may also include, for example, transforming content from a high resolution format (e.g. an .mpeg video file) into a low resolution format (e.g. .mkv) and vise-versa. Skilled artisans will appreciate other equivalent transcoding operations that may be performed by data manipulation module 310 without departing from the scope of the inventive concepts presented herein, upon completing a full review of the detailed description.

Further still, data manipulation module 310 may be configured, in other embodiments, to perform lossy manipulation operations, e.g. upon write. In one such approach, lossy manipulation includes returning only filtered content, e.g. a subset of records or portions of such records that are not subject to protection/restricted access. Lossy manipulation in the form of returning filtered content may be particularly useful in the context of blind studies or other research applications, storage systems handling sensitive data (e.g. sensitive personal information such as medical information, financial information, legal information, etc.).

Lossy manipulation may additionally or alternatively include, in another embodiment, filtering content received as part of a write request and/or subject to a write operation. For example, in response to determining a particular storage location designated in a write request is publicly accessible, the data subject to write may be filtered to remove sensitive information such as names, social security numbers, account numbers, routing numbers, etc. etc. from the write request. As such, only the insensitive information will be written to the publicly-accessible storage location.

With continuing reference to FIG. 3B and data manipulation module 310 in particular, in more embodiments the data manipulation module is configured to perform content generation, e.g. by extracting content from one or more data records and/or processes, and optionally merging such content using cognitive techniques, machine learning, and/or artificial intelligence, in various applications.

In still more embodiments, data manipulation module 310 is configured for access redirection capabilities, and may delay, stop, or redirect access to a particular storage location. For example, in response to determining presence of malware in a storage system 300, the data manipulation module 310 may delay, stop, or redirect access of the malicious code. Such manipulation may include honey-pot diversion techniques, quarantining malware to insensitive storage locations (e.g. locations not storing any proprietary, confidential, or personal information), etc. as would be appreciated by a person having ordinary skill in the art upon reading the present disclosure.

In preferred approaches, at least the virtual path module 306 and data manipulation module 310 operate via evaluating conditions stated in policy rules, at specified junctions within the storage system 300, and/or associated workflows.

This is reflected in FIG. 3B via the various paths (indicated by arrows) which a user's request may traverse and/or be handled by the storage system 300, in myriad embodiments. Generally speaking, and in preferred approaches all requests are parsed/analyzed by each of modules 306-310, but in various approaches a request may be analyzed and processed only by a subset of modules 306-310, in any order and/or combination.

Accordingly, in exemplary approaches a set of allowed transformations are defined to the storage system as a set of rules. Each rule defines the object(s) or file(s) to which it applies, the name of the transformation that is allowed on the object/file and the method to manipulate the object/file. When the objects are listed, e.g. in response to receiving the request for access, any matching a transformation rule, then additional entries may be generated to define the set of allowed transformations. A lookup of the object must recognize the name of the transformation, then identify the actual target of the lookup. As the data is read the transformation method is applied to the original data to return only the transformed data to the caller.

According to several exemplary embodiments, content transformations performed or capable of being performed by data manipulation include, but are not limited to: security applications, for purposes of clarifying information represented in/by data, for system integrity checks, for consistency checks, for performance evaluation, etc.

For example, security applications may include, de identification/obfuscation of sensitive material such as patient name/address in patient records, credit card numbers, social security numbers; encryption/decryption, etc. may be provided based on a user's credentials.

Clarifying operations may include: summarization and/or statistical calculations of data record(s) and/or data set(s).

Integrity checks may include: running an antivirus scan, running error correction code (ECC) checks, checking digital signatures, watermarks, adding digital signatures, etc. in various approaches.

Performance evaluations or considerations may include: down sampling an image, change quality of a .pdf, etc. as would be appreciated by a skilled artisan upon reading the present disclosures.

Protocol or application specific requests may include: changing an image from color to grayscale, running image correction, blanking out photographs, etc.

Cognitive analytics may include, e.g. image classification, pattern recognition, or other machine-learning and/or artificial intelligence-based analyses.

Privacy concerns, particularly in machine learning and deep learning applications, include but are not limited to: computing and returning output of learning primitives (e.g. gradient loss) over a requested data in a privacy-preserving manner.

Manipulation can be done on writes as well, wherein transformation could be lossy or not. Whether performed on read or on write, exemplary manipulations may include, in various embodiments: down sampling an image before writing to disk; de-deidentification of sensitive records, and/or obfuscation of data record identity.

Upon detecting an intruder, subsequent writes may be nullified, a retention policy or policies be set on scratchpad/transient data; instructions issued to only retain a summary, and/or signing content stored on a storage system; and/or adding a header to collect/collate provenance for future transformations/accesses.

Figure 4:
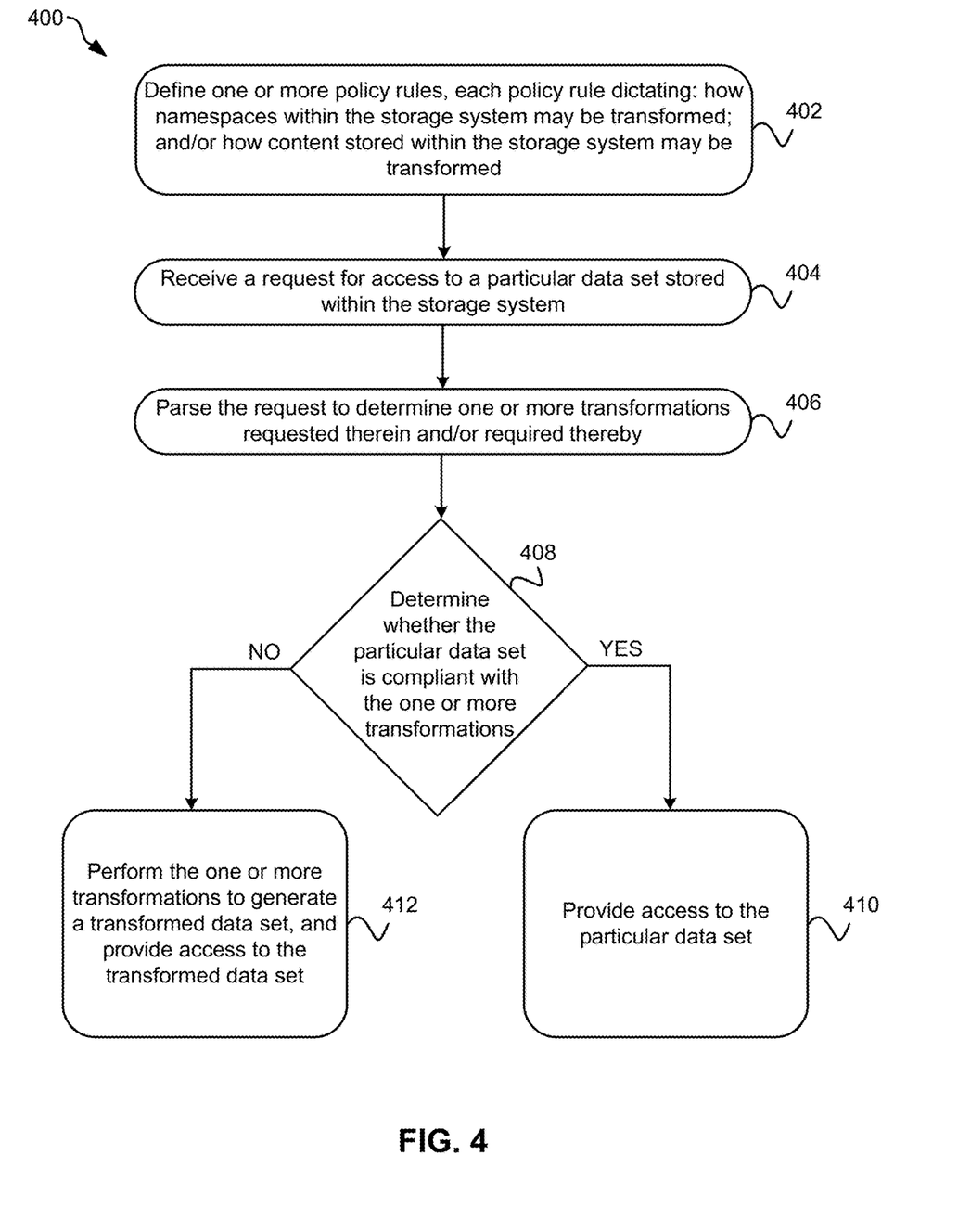
FIG. 4 is a flowchart of a method, according to one embodiment.

Now referring to FIG. 4, a flowchart of a method 400 is shown according to one embodiment. The method 400 may be performed in accordance with the present invention in any of the environments depicted in FIGS. 1-2 and 3B, among others (excluding FIG. 3A), in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a data storage system, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where policy rules are defined for a storage system. The policy rules may be defined in any suitable manner, but preferably are defined/provided in a compiled form, and as part of one or more data structures the storage system is pre-configured to parse and determine appropriate actions to take in response to requests for access to data stored in the storage system. Preferably, the policy rules are provided in the form of one or more decision trees, and dictate: how namespaces within the storage system may be transformed; how content stored within the storage system may be transformed, or both.

In operation 404, method 400 includes receiving a request for access to a particular data set stored within the storage system. The access request is preferably received from a user, but may be received from another system communicatively coupled to the storage system, in various approaches.

Method 400 involves parsing the request to determine one or more transformations requested therein or required thereby, in operation 406. The request may be parsed in any suitable manner, but preferably the parsing does not require any additional functionality beyond that native to the storage system. In other words, preferably the request may be parsed in a manner identical to any other data request, and any transformations required pursuant to the request may be determined with respect to the policy rules defined in operation 402, and/or based on parameters specified directly in the request.

Accordingly, in operation 408 the storage system determines whether the particular data set is compliant with the one or more transformations requested in, and/or required by, the request for access to the particular data set. For instance, determining whether a transformation is requested in a request may include evaluating a path specified in the request, where the path itself specifies the one or more transformations, e.g. by delineating a desired format, size, portion, etc. of the data set subject to the request. On the other hand, determining whether the request requires one of more transformations may be accomplished by evaluating the policy rules with respect to the particular data set, e.g. to determine if the data set is already in a form required by (but not necessarily specified directly in) the request. For instance, a storage system policy rule may dictate that all access to image data is provided in the form of a thumbnail. Another storage system policy rule may dictate certain users who are entitled to access certain data, and/or users who are restricted from access to particular data. The requested data may be manipulated and/or formatted according to the restrictions stated in the policy rule (and optionally based on the identity of the user, time of day, day of week, or any other suitable criterion specified in the policy rule) and provided to the requesting entity only after such manipulations/transformations are performed.

Accordingly, and based on the result of the determination performed in operation 408, access to the particular data set specified in the request may be provided, or access to a transformed data set may be provided.

More specifically, in operation 410, in response to determining the particular data set is compliant with the one or more transformations, access to the particular data set is provided.

Conversely, in operation 412, and in response to determining the particular data set is not compliant with the one or more transformations, the one or more transformations are performed on the particular data set, so as to generate a transformed data set, and access to the transformed data set is provided by the storage system.

Of course, it shall be understood that method 400, in various embodiments, may include any number, combination, permutation, etc. of additional or alternative features, functions, operations, components, modules, etc. as described herein, without limitation. In preferred approaches, method 400 includes at least one of namespace manipulation (e.g. as described with reference to virtual path module 306 of FIG. 3B), user-requested overloading (e.g. as described with reference to overload module 308 of FIG. 3B); and/or transparent data manipulation (e.g. as described with reference to data manipulation module 310 of FIG. 3B), among other features/functions, etc. described herein, without limitation.

In particularly preferred approaches, method 400 includes any one or more of the following functions, features, operations, etc. in various combinations.

In one embodiment, the policy rules defined in operation 402 are evaluated upon access to one or more strategic junctions within the storage system, the one or more strategic junctions being within a directory structure of the storage system and/or a functional stack applicable to the storage system.

Moreover, the request for access preferably includes one or more user-requested transformations, and the method 400 thus includes performing the one or more user-requested transformations, in some approaches. For example, the one or more transformations may be specified in a pathname included in the request.

In another approach, the one or more transformations required by the request comprise rendering a virtual path to one or more files that logically exist within the storage system, but do not physically reside on the storage system.

Further still, the one or more transformations required by the request may include transforming the data set in a manner transparent to: a user submitting the request for access; and/or an application utilizing the particular data set.

In yet another embodiment, method 400 may include performing one or more transformations on a data set prior to writing the data set to a storage location within the storage system.

Uses and Applications

In various embodiments, and in accordance with the foregoing descriptions, the inventive concepts presented herein may be employed to advantage in a great number of exemplary use cases and/or applications.

Illustrative examples of such applications/use cases include, but are not limited to: transparent content manipulation in storage systems; transparent namespace manipulation in storage systems; user specified content and namespace manipulation by augmenting file/object path; securing/filtering/tuning access of content to untrusted applications; surreptitiously containing malicious code or other source of malicious attack; augmenting native storage/file system behavior to allow content obfuscation; augmenting native storage/file system behavior to inject noise into data, e.g. for deep learning applications; enabling containment within a storage system to combat malicious access, and/or virtualizing namespaces natively by storage/filesystem.

Those having ordinary skill in the art will appreciate the various applications and contexts in which the inventive concepts described herein will prove useful, and may employ such inventive concepts in said applications and contexts without departing from the scope of the invention detailed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for namespace and content manipulation within a storage system, the method comprising:
    defining one or more policy rules, each policy rule dictating: how namespaces within the storage system may be transformed; and/or how content stored within the storage system may be transformed;
    receiving a request for access to a particular data set stored within the storage system;
    parsing the request to determine one or more transformations requested therein and/or required thereby;
    determining whether the particular data set is compliant with the one or more transformations;
    in response to determining the particular data set is compliant with the one or more transformations, providing access to the particular data set; and
    in response to determining the particular data set is not compliant with the one or more transformations, performing the one or more transformations to generate a transformed data set, and providing access to the transformed data set;
    wherein the one or more transformations required by the request comprise transforming the particular data set in a manner transparent to an application utilizing the particular data set;
    wherein transforming the particular data set in the manner transparent to the application utilizing the particular data set comprises transforming the particular data set to a more space efficient format than a format of the particular data set prior to transforming the particular data set; and
    wherein transforming the particular data set in the manner transparent to the application utilizing the particular data set does not interrupt operation of the application utilizing the particular data set while transforming the particular data set.

2. The computer-implemented method of claim 1, wherein the policy rules are evaluated upon access at one or more strategic junctions within the storage system, the one or more strategic junctions being within a functional stack applicable to the storage system.

3. The computer-implemented method of claim 1, wherein the one or more policy rules each independently comprise:
    an indication of:
        one or more objects stored within the storage system to which the policy rule applies; and/or
        one or more files stored within the storage system to which the policy rule applies; and
    a designation of one or more transformations permitted for the one or more objects and/or the one or more files.

4. The computer-implemented method of claim 1, wherein the one or more transformations required by the request comprise rendering a virtual path to one or more files that logically exist within the storage system, but do not physically reside on the storage system.

5. The computer-implemented method of claim 1, comprising:
    performing the one or more transformations on the particular data set prior to writing the transformed data set to a storage location within the storage system; and
    overloading one or more user-specified data paths of the storage system, wherein overloading the one or more user-specified data paths comprises one or more functions selected from the group consisting of: displaying a portion of the particular data set, and summarizing at least a portion of the particular data set.

6. The computer-implemented method of claim 1, wherein the one or more policy rules that dictate how content may be transformed within the storage system are configured to cause a data manipulation module to perform:
    transparent data manipulations; transcoding operations; access redirection operations; lossy manipulation operations; security applications; clarifying operations; integrity checks; performance evaluations; application-specific requests; cognitive analytics; and combinations thereof.

7. The computer-implemented method of claim 1, wherein the policy rules comprise decision trees.

8. A computer program product for namespace and content manipulation within a storage system, the computer program product comprising a computer readable storage medium having program instructions embodied therewith, wherein the computer readable storage medium is not a transitory signal per se, the program instructions executable by the storage system to cause the storage system to perform a method comprising:

defining, using a processor of the storage system, one or more policy rules, each policy rule dictating: how namespaces within the storage system may be transformed,
   and/or how content stored within the storage system may be transformed;
   receiving, at the storage system, a request for access to a particular data set stored within the storage system;
   parsing, using the processor, the request to determine one or more transformations requested therein and/or required thereby;
   determining, using the processor, whether the particular data set is compliant with the one or more transformations;
   in response to determining the particular data set is compliant with the one or more transformations, providing access to the particular data set; and
   in response to determining the particular data set is not compliant with the one or more transformations, performing the one or more transformations to generate a transformed data set, and providing access to the transformed data set;
   wherein the one or more transformations required by the request comprise transforming the particular data set in a manner transparent to an application utilizing the particular data set;
   wherein transforming the particular data set in the manner transparent to the application utilizing the particular data set comprises transforming the particular data set to a more space efficient format than a format of the particular data set prior to transforming the particular data set; and
   wherein transforming the particular data set in the manner transparent to the application utilizing the particular data set does not interrupt operation of the application utilizing the particular data set while transforming the particular data set.

9. The computer program product of claim 8, wherein the policy rules are evaluated at strategic junctions within the storage system and/or within a control path, each strategic junction within the storage system and/or within the control path being independently selected from the group consisting of: a time of parsing namespaces, a time of inspecting content, a time of reading content, a time of writing content, a time of verifying content access privilege(s), and combinations thereof.

10. The computer program product of claim 8, wherein the one or more transformations are specified in a pathname and/or a URL included in the request.

11. The computer program product of claim 8, wherein the one or more transformations required by the request comprise rendering a virtual path to one or more files that logically exist within the storage system, but do not physically reside on the storage system.

12. The computer program product of claim 8, comprising program instructions for causing the storage system to:

perform, using the processor, the one or more transformations on the particular data set prior to writing the transformed data set to a storage location within the storage system; and
   overload, using the processor, one or more user-specified data paths of the storage system, wherein overloading the one or more user-specified data paths comprises one or more functions selected from the group consisting of: formatting the particular data set, displaying a portion of the particular data set, and summarizing at least a portion of the particular data set.

13. The computer program product of claim 8, wherein the one or more policy rules that dictate how content may be transformed within the storage system are configured to cause a data manipulation module to perform: transparent data manipulations;
   transcoding operations; access redirection operations; lossy manipulation operations;
   security applications; clarifying operations; integrity checks; performance evaluations;
   application-specific requests; cognitive analytics; and combinations thereof.

14. Computer program product of claim 8, wherein the policy rules comprise decision trees.

15. A storage system for namespace and content manipulation,
   comprising:
   a processor; and
   logic integrated with the processor, executable by the processor, or integrated with and executable by the processor, the logic being configured to:
   define one or more policy rules, each policy rule dictating: how namespaces within the storage system may be transformed; and/or how content stored within the storage system may be transformed;
   receive a request for access to a particular data set stored within the storage system;
   parse the request to determine one or more transformations requested therein and/or required thereby;
   determine whether the particular data set is compliant with the one or more transformations;
   in response to determining the particular data set is compliant with the one or more transformations, provide access to the particular data set; and
   in response to determining the particular data set is not compliant with the one or more transformations, perform the one or more transformations to generate a transformed data set, and provide access to the transformed data set;
   wherein the one or more transformations required by the request comprise transforming the particular data set in a manner transparent to an application utilizing the particular data set;
   wherein transforming the particular data set in the manner transparent to the application utilizing the particular data set comprises transforming the particular data set to a more space efficient format than a format of the particular data set prior to transforming the particular data set; and
   wherein transforming the particular data set in the manner transparent to the application utilizing the particular data set does not interrupt operation of the application utilizing the particular data set while transforming the particular data set.

16. The system of claim 15, wherein the policy rules are evaluated upon access to one or more strategic junctions within the storage system, the one or more strategic junctions being within a directory structure of the storage system and/or within a functional stack applicable to the storage system.

17. The system of claim 15, wherein the one or more transformations required by the request comprise rendering a virtual path to one or more files that logically exist within the storage system, but do not physically reside on the storage system.

18. The system of claim 15, comprising logic configured to perform the one or more transformations on the particular data set prior to writing the particular data set to a storage location within the storage system; and
  overload one or more user-specified data paths of the storage system, wherein overloading the one or more user-specified data paths comprises one or more functions selected from the group consisting of: formatting the particular data set, displaying a portion of the particular data set, and summarizing at least a portion of the particular data set.

19. The system of claim 15, wherein the one or more policy rules that dictate how content may be transformed within the storage system are configured to cause a data manipulation module to perform: transparent data manipulations; transcoding operations;
  access redirection operations; lossy manipulation operations; security applications;
  clarifying operations; integrity checks; performance evaluations; application-specific requests; cognitive analytics; and combinations thereof.

20. The system of claim 15, wherein the policy rules comprise decision trees.

* * * * *